(12) United States Patent
Bähr (10) Patent No.: US 12,313,172 B2
(45) Date of Patent: May 27, 2025

(54) PILOT STAGE WITH BALL-CONICAL SEAT

(71) Applicant: RAPA Automotive GmbH & Co. KG, Selb (DE)

(72) Inventor: Sebastian Bähr, Selb (DE)

(73) Assignee: RAPA Automotive GmbH & Co. KG, Selb (DE)

( * ) Notice: Subject to any disclaimer, the term of this patent is extended or adjusted under 35 U.S.C. 154(b) by 0 days.

(21) Appl. No.: 18/152,996

(22) Filed: Jan. 11, 2023

(65) Prior Publication Data

US 2023/0220920 A1 Jul. 13, 2023

(30) Foreign Application Priority Data

Jan. 11, 2022 (DE) .......................... 102022100558.5

(51) Int. Cl.
| | |
|---|---|
| *F16F 9/512* | (2006.01) |
| *F16F 9/34* | (2006.01) |
| *F16F 9/46* | (2006.01) |
| *F16K 15/04* | (2006.01) |
| *F16K 15/18* | (2006.01) |
| *F16K 31/40* | (2006.01) |
| *G05D 16/20* | (2006.01) |

(52) U.S. Cl.
CPC .......... *F16K 15/1843* (2021.08); *F16F 9/34* (2013.01); *F16F 9/512* (2013.01); *F16K 15/04* (2013.01); *F16K 31/40* (2013.01); *G05D 16/2097* (2019.01); *F16F 9/465* (2013.01)

(58) Field of Classification Search
CPC .............. F16K 15/1843; F16K 31/40; F16K 15/04–044; F16F 9/5126; F16F 9/34; F16F 9/465; G05D 16/2097
See application file for complete search history.

(56) References Cited

U.S. PATENT DOCUMENTS

| | | | | |
|---|---|---|---|---|
| 1,305,747 | A * | 6/1919 | Sechrist | F16K 15/044 303/79 |
| 3,421,547 | A * | 1/1969 | Wilfred | F16K 15/044 137/543.19 |
| 9,915,276 | B2 * | 3/2018 | Bruck | F15B 13/0433 |
| 11,473,693 | B2 * | 10/2022 | Idalski | F16K 31/10 |
| 2002/0014543 | A1 * | 2/2002 | Ness | F16K 15/044 239/569 |
| 2009/0090882 | A1 * | 4/2009 | Reilly | F16K 31/426 251/129.15 |
| 2015/0101688 | A1 * | 4/2015 | Giessauf | F16K 17/30 137/535 |

FOREIGN PATENT DOCUMENTS

| | | |
|---|---|---|
| DE | 102009006445 B3 | 7/2010 |
| DE | 102012006681 A1 | 10/2013 |
| DE | 112017006181 B4 | 11/2021 |
| JP | 6788947 B2 | 11/2020 |
| WO | 2009157841 A1 | 12/2009 |

OTHER PUBLICATIONS

Office Action dated Aug. 12, 2022, in corresponding German Application No. 102022100558.5, 19 pages.

* cited by examiner

*Primary Examiner* — Marina A Tietjen (74) *Attorney, Agent, or Firm* — Maier & Maier, PLLC (57) ABSTRACT

A pressure regulation valve including a pilot stage valve with a ball valve body and a conical seat. A shock absorber with at least one pressure regulation valve.

14 Claims, 9 Drawing Sheets

PILOT STAGE WITH BALL-CONICAL SEAT

FIELD OF THE INVENTION

The present invention relates to a pre-controlled pressure regulation valve and a shock absorber.

BACKGROUND OF THE INVENTION

Valves for regulating hydraulic shock absorbers exist in various construction types. Besides directly controlled proportional valves, known i.a. from EP 3 591 273, also pre-controlled pressure regulation valves are used, such as known for example from WO 2009 157 841 A1 or WO 2020 182 358 A1.

In such pre-controlled pressure regulation valves, the oil flow to be regulated is guided through a main stage and throttled more or less strongly there. The actuation of the main stage is not effected directly by a magnetic drive here, but with the aid of a second valve stage, the so-called pilot stage, with a pilot stage valve. The pilot stage valve controls the pressure on at least one side of the main stage valve and thereby is in a position to produce fluid-dynamical forces in the main stage, which operate the main stage valve. The pilot stage valve itself is readjusted by means of an electromagnetic actuator. It is an advantage of this multi-stage construction type that it is possible to produce high operation forces in the main stage with relatively small electromagnetic actuators. The valves are thus comparatively robust against hydraulic disturbing forces and are constructed very compactly.

In the field of shock-absorber regulation valves the forming of variants plays an important role for technical reasons. The regulation valve function is laid out in interaction with the shock absorber and adjusted thereto. For different shock absorber types or applications, different shock absorber adjustings and thus corresponding variants of the pressure regulation valve are required.

One important factor in the adjusting of the shock absorber, for example, is the opening pressure of the regulation valve. It determines the maximum shock absorbing force and accordingly the range of the shock absorber. The opening pressure is defined by the configuration of the pilot stage. In pilot stage valves of a seat construction type, as is the case in the above-cited documents, the opening pressure can be set via the equality of forces of magnetic force and, possibly, a spring force of the actuator and the pressure force of the fluid. In order to implement various opening pressures, the seat diameter and thereby the pressure force is usually varied.

The pilot valves of known pressure regulation valves are generally formed by complex components, which are mutually sealed by planar areas. Accordingly, high demands are placed on surfaces and shape deviations of the valve elements, which leads to a correspondingly great manufacturing effort. Moreover, the valve members are integrated into the complete construction of the regulation valve in such a manner that a variant formation of the opening pressure can be implemented with the aid of the seat diameter only with difficulty.

SUMMARY OF THE INVENTION

It is the object of the invention to state a cost-effective pressure regulation valve with a reduced manufacturing effort. Further, it is the object of the invention to state a corresponding shock absorber.

This object is achieved by an apparatus having the features of the independent claims. Advantageous embodiments and developments are stated in the claims dependent thereon.

The pressure regulation valve according to the invention has a pilot stage valve with a ball valve body and preferably a conical seat as the valve seat for the ball valve body. In contrast to seat valves with planar sealing areas, for example, such a ball-conical seat pairing places less stringent requirements with respect to the characteristics and/or the exactness of the sealing areas or surfaces creating the valve seat. This allows for reducing the manufacturing effort of the pilot stage valve and for making available a more cost-effective pilot stage valve, while at the same time keeping the variance of parameters of the pilot stage valve and/or the pressure regulation valve to a minimum. The ball valve body is a completely spherical body, preferably in accordance with the quality grade G5 (according to DIN 5401). The dimensional tolerance and shape tolerance accordingly amounts to maximally 0.25 µm. The diameter of the ball valve body is preferably in the range between 1 and 10 mm and amounts to 1, 2, 3, 5, 8 or 10 mm, for example, wherein each of the values mentioned can also represent an upper or lower limit of the range of values mentioned. The opening diameter of the conical seat is preferably in the range between 1.5 and 4 mm and amounts to 1.5, 2.0, 2.5, 3.0, 3.5 or 4 mm, for example, wherein each of the values mentioned can also represent an upper or lower limit of the range of values mentioned. The cone angle (opening angle) of the conical seat is preferably in the range between 100° and 140° and amounts to 100°, 110°, 120°, 130° or 140°, for example, wherein each of the values mentioned can also represent an upper or lower limit of the range of values mentioned.

The pilot stage valve preferably further has a guide section for guiding the ball valve body when said body is lifted off the valve seat or conical seat and/or opens the pilot stage valve. The guide section is accordingly located downstream of the conical seat and/or has a cylindrical inner wall that extends coaxially to a valve axis of the pilot stage valve or the central axis of the pressure regulation valve. This makes it possible for the valve body not to be guided actively or force-guided, for example by an operation member of an actuator, and a component that relates to several assembly groups or modules, for example consisting of the operation member and the valve body, can be avoided. This simplifies the mechanical interaction between the pilot stage and the actuator and opens up a greater degree of freedom with respect to the (constructive) configuration of the actuator. An operation of the pilot stage valve by the actuator then occurs preferably only by abutting or only by a contacting engagement of the operation member on the ball valve body.

The inner diameter of the guide section is accordingly identical to the diameter of the ball valve body plus play (with reference to the diameter), preferably in the range between 0.01 and 0.1 mm and amounts to 0.01, 0.02, 0.03, 0.05, 0.08 or 0.1 mm, for example, wherein each of the values mentioned can also represent an upper or lower limit of the range of values mentioned. The length of the guide section above the conical seat is preferably in the range between 3 and 30 mm and amounts to 3, 5, 8, 10, 15, 20 or 30 mm, for example, wherein each of the values mentioned can also represent an upper or lower limit of the range of values mentioned.

The pilot stage valve preferably has a module body which makes available or has the conical seat and the guide section and which is particularly preferably formed in single-piece fashion. Accordingly, in the simplest case the pilot stage valve consists of exactly the ball valve body and the module body, i.e. of two single-piece components.

Preferably the guide section does not have mechanical protection (such as an elevation or groove on the inner side of the guide section) against removal of the ball valve body from the guide section. This simplifies the mounting of the pilot stage valve. The operation member of the actuator preferably creates protection against a removal of the ball valve body from the guide section when the pressure regulation valve has been mounted.

The pilot stage valve or its module body preferably has a receiving section upstream of the conical seat for optionally or selectively receiving and attaching a fluid component, for example a throttle, in or on the pilot stage valve. The receiving section is preferably formed as a recess and/or cylindrical recess, which extends coaxially to the valve axis or central axis. The inner wall of the recess preferably has a thread or inner thread for mounting the fluid component which can then be mounted with little effort in the pilot stage valve. Depending on the application, it is also possible to provide different throttles, which facilitates the formation of variants. Alternatively, the inner wall of the receiving section formed as a recess can also be formed as a smooth, cylindrical area, so that a selected fluid component can be pressed into the recess or can also be inserted and subsequently attached in the pilot stage valve or its module body, for example by welding or soldering. Such a throttle limits the through-flow through the pilot stage when the pilot stage valve is (completely) opened. When the fluid component is formed as a throttle, the throttle cross section is preferably in the range between 0.01 and 1 $mm^2$ and amounts to 0.01, 0.02, 0.05, 0.1, 0.2, 0.5 or 1 $mm^2$, wherein each of the values mentioned can also represent an upper or lower limit of the range of values mentioned.

The pilot stage valve preferably has a failsafe function. For this purpose the pilot stage valve has a failsafe valve seat on the end of the guide section located opposite the conical seat, and preferably a spring member which biases the ball valve body into the failsafe valve seat. The ball valve body thus sits securely in the failsafe valve seat when the actuator is unenergized, i.e. without actuator forces, for example in the event of a power outage. The failsafe valve seat thus forms a second, additional valve seat, which is preferably likewise formed as a conical seat. The spring member is supported within the conical seat here. The guide section is not completely open toward the side opposite the conical seat in this case, but merely has an axial opening in the face side of the pilot stage module or on the valve axis for operation by the actuator. The pilot stage valve in the currentless state is thus securely opened or partially opened with a defined opening cross section, which is smaller than the maximum opening cross section of the pilot stage valve. The pilot stage valve preferably has bypass openings and/or the ball valve body does not seal the failsafe valve seat completely. The failsafe valve seat preferably has a polygon as the axial through opening or valve opening, in particular a regular polygon, for example a (n equilateral) triangle, quadrangle, square, hexagon, hexagon or octagon.

The pilot stage valve preferably has a failsafe construction member which has the failsafe valve seat and is preferably formed as a cap or sleeve for the module body. Further, in this case no radial outflow openings are provided in the pilot stage valve or the module body thereof, and/or these are closed by the failsafe construction member.

In a preferred embodiment the pressure regulation valve has a multiplicity of function modules, namely at least a pilot stage module and an actuator module, i.e. at least two function modules.

A function module generally is an assembly group, more exactly a modular assembly group of the pressure regulation valve, which makes available (completely) a specific functionality provided in each case for this assembly group or the function module, and which comprises all or at least all substantial constructive construction members for this functionality. Function modules are thus structurally and functionally different or mutually delimited assembly groups of the pressure regulation valve, which, in the mounted pressure regulation valve, preferably do not have any components that relate to several assembly groups or modules. In the simplest case, thus a given functionality in the pressure regulation valve is made available exclusively by the function module in question and/or by exactly one function module.

The pilot stage module of the pressure regulation valve accordingly implements (exactly or at least) the functionality of the pilot stage in the pressure regulation valve, which serves to fluid-dynamically, usually hydraulically, pre-control the pressure regulation valve or the main stage thereof, and/or contains the components or all components required for the purpose, such as a pilot stage valve. Accordingly, in the simplest case the functionality of the pilot stage in the pressure regulation valve is made available exclusively by the pilot stage module. The pilot stage module consists exactly of the pilot stage valve in the simplest case.

The actuator module of the pressure regulation valve implements (exactly or at least) the functionality of the actuator in the pressure regulation valve, which serves to operate the pilot stage or the pilot stage module or the pilot stage valve of the pilot stage module, in particular a valve body of the pilot stage valve, and/or contains the components required for this purpose, such as, for example, a coil and a magnetic armature and possibly a spring member. Accordingly, in the simplest case the functionality of the actuator in the pressure regulation valve is made available exclusively by the actuator module.

Advantageously, the pilot stage module and the actuator module, preferably all function modules of the pressure regulation valve, are each formed as pre-mounted or pre-produced modules or assembly groups. In other words, preferably all components of a function module are integrated in or integrated to form a (pre-mounted) assembly group. Likewise, in the pressure regulation valve advantageously function modules that are firmly interconnected immediately are firmly interconnected via only exactly one mechanical interface and/or with exactly one joining method (e.g. by pressing, welding, soldering, etc.). This simplifies the mounting and/or the final mounting of the pressure regulation valve.

Preferably, the pilot stage module and the actuator module are firmly interconnected via a press connection, preferably exactly and/or exclusively via a press connection, and are arranged such that they immediately adjoin one another. Besides a simple and sufficiently firm attachment of the pilot stage module in or on the actuator module, such a press connection allows for adjusting or finely tuning the position of the pilot stage module and the actuator module relative to one another, for example during mounting and/or also subsequent to mounting. A press connection creates a force-fit or frictional fit along respectively corresponding press areas.

The actuator module preferably has an actuator with an actuator axis, i.e. the actuation (of the pilot stage valve) occurs (by reciprocal movement) along a straight section. Accordingly, the actuator is preferably a linear actuator.

Further, for making available the or the exactly one press connection with the pilot stage module, the actuator module has a or exactly one radial, coaxial, co-linear or concentric press area that is preferably cylindrical and/or directed toward the actuator axis, wherein the press area is preferably completely continuous, but can possibly also be subdivided into several partial areas or have interruptions. This press area preferably creates exactly one press connection. This press area preferably forms the (inner or inwardly facing) surface or mantle area of a recess in the actuator module, wherein the recess comprises the actuator axis and is preferably formed cylindrically or substantially cylindrically and/or coaxially, co-linearly or concentrically to the actuator axis. The actuator axis is preferably simultaneously an axis of symmetry and/or central axis of the (complete) actuator module or the actuator.

The pilot stage module preferably has a pilot stage valve which can be operated along a or the valve axis and which is preferably a seat valve. In the simplest case, the pilot stage valve has a valve body which is slidable along the valve axis and opens and closes the pilot stage valve, for example when the valve body is lifted off a corresponding valve seat or enters into the valve seat. In other words, the actuator module, upon operating the pilot stage, causes and/or allows a usually reciprocal and/or straight movement of the valve body along the valve axis.

Further, for creating the or exactly one press connection with the actuator module, the pilot stage module has a radial, coaxial, co-linear or concentric press area that is preferably cylindrical and/or directed away from the valve axis and corresponds with the press area of the actuator module, wherein the press area is preferably completely continuous, but can possibly also be subdivided into several partial areas or have interruptions, which then preferably corresponds with corresponding partial areas or interruptions of the press area of the actuator module. This press area creates preferably exactly one press connection. Preferably, this press area forms the (outer or outwardly facing) surface or mantle area of the pilot stage module, wherein the complete pilot stage module is preferably formed cylindrically or substantially cylindrically and/or rotationally-symmetrically (possibly by the exception of radial fluid openings). The valve axis preferably forms an axis of symmetry and/or central axis of the (complete) pilot stage module. The pilot stage module thus forms a cartridge which corresponds with the above-described recess in the actuator module and is received therein partially or completely, so that the corresponding press areas create a press connection between the actuator module and the pilot stage module.

Accordingly, in the mounted pressure regulation valve then the actuator axis of the actuator module and the valve axis of the pilot stage module coincide to form one or the common central axis of the pressure regulation valve, so that the actuator module or the actuator of the actuator module can operate the pilot stage valve of the pilot stage module along this central axis. Due to the press connection according to the invention, then the above-described adjustment or fine tuning can be carried out along this central axis and thus the axial position of the actuator module and the pilot stage module relative to one another along the central axis can be adjusted or finely tuned. This permits reducing a variance (for example with respect to a spring and/or magnetic and/or actuator force and/or an opening pressure) in one batch of several pressure regulation valves or in serial production, for example with reference to an air gap and/or a remanence distance of a magnetic armature in the actuator, in particular when said actuator closes the pilot stage valve or when the valve body abuts on the valve seat in the pilot stage valve. Preferably, the variations of the opening pressure in one batch are below 10%, particularly preferably below 5%.

The actuator module generally has an operation member with which the actuator module operates the pilot stage valve of the pilot stage module. In the simplest case, the operation member is the magnetic armature itself, which usually consists completely of magnetic material, or a preferably non-magnetic piston, which is then, for example, firmly connected to the magnetic armature or forms a single-part construction member, which is adapted, for example, to execute reciprocal and/or straight movements along the actuator axis or the common central axis. The operation member, upon operating or for operating the pilot stage valve, advantageously (merely) adjoins or abuts on the valve body of the pilot stage valve of the pilot stage module. In other words, the operation member advantageously is (merely or exactly) in contacting engagement with the valve body of the pilot stage valve of the pilot stage module, in particular when the valve body closes the pilot stage valve or when the valve body abuts on the valve seat. There is thus no mechanical connection between the operation member and the valve body, i.e. no force-guiding of the valve body by the operation member of the actuator module takes place. Accordingly, a component that relates to several modules (between the actuator module and the pilot stage module) is avoided or does not arise. The valve body of the pilot stage valve is advantageously non-magnetic or magnetically non-conductive.

Preferably, the pilot stage module and the actuator module are firmly interconnected exclusively via the press connection according to the invention. This simplifies the mounting of the pressure regulation valve and simultaneously permits adjustment or re-adjustment during the mounting of the pressure regulation valve or separated in time therefrom.

Due to the modular construction according to the invention of the pilot stage and the actuator of the pressure regulation valve, in the form of the pilot stage module and the actuator module, it is not only possible to avoid components that relate to several assembly groups or modules, but also the (preferably only) mechanical interface (here the press connection with corresponding press areas on the pilot stage module and the actuator module) for creating the firm mechanical connection between the pilot stage module and the actuator module is simplified. Therefore, it is possible, for example, to swap a function module against a variant thereof easily. In other words, the pressure regulation valve according to the invention facilitates the forming of variants or the forming of various pressure regulation valves with different parameters, since an adaptation is often required only with respect to one functionality and then only the corresponding, i.e. one single function module, has to be swapped against a variant thereof, while the other components and/or function modules of the pressure regulation valve remain unchanged and are thus same parts. Accordingly, also the interface for attaching the function module preferably remains unchanged in variants of a function module. For example, a pilot stage module with a different opening cross section or valve seat diameter can be employed in order to change an opening pressure and/or a pressure increase or decrease of the pressure regulation valve. Likewise, an actuator module with a different working principle (for example NC (normally closed; closed in currentless state) or NO (normally open; open in currentless state) or different magnetic forces and/or spring forces and/or force profiles can be chosen. Likewise, the pressure regulation valve can be adapted (for different applications) to various external mechanical, hydraulic and/or electrical interfaces or also construction space requirements.

In a preferred embodiment, the pressure regulation valve according to the invention comprises a main stage module as a further function module, said main stage module containing (exactly or at least) the functionality of the main stage of the pressure regulation valve and containing at least one main stage valve for this purpose. The main stage of the pressure regulation valve is also implemented accordingly as a function module. The main stage module is firmly connected to the actuator module (or possibly also the pilot stage module). Preferably, this is done again via a press connection and/or exactly one mechanical interface or exactly one joining method. In the simplest case, the main stage module is firmly connected exclusively via a press connection to the actuator module or the pilot stage module. For this purpose the main stage module and the actuator module or pilot stage module each have corresponding, preferably cylindrical press areas, which are arranged radially, coaxially, co-linearly or concentrically to the common valve axis of the pressure regulation valve. Further, the main stage module or the main stage valve thereof preferably has a central axis or axis of symmetry, which coincides with the central axis of the pressure regulation valve particularly preferably in the mounted pressure regulation valve. The main stage module or the main stage valve thereof is accordingly arranged coaxially to the pilot stage module and/or actuator module. Advantageously, also the main stage module or at least the main stage valve thereof is formed cylindrically or substantially cylindrically and/or rotationally-symmetrically (possibly by the exception of radial fluid openings). Otherwise, the statements made above with reference to the pilot stage module are applicable analogously also to the main stage module. The main stage module advantageously comprises or consists of a main stage valve, which is formed as a passive seat valve or as a piston slide valve, and a main stage housing. Advantages result in dynamic operation, if the main stage valve is formed as a seat valve, since a seat valve has a faster response. In comparison to a piston slide valve, a seat valve reacts faster to sudden volume flow changes, since, in contrast to the piston slide valve, it does not require positive overlap in order to implement small leaks. It is possible to thus reduce or avoid in the main stage valve, for example, overshoots with respect to pressure upon a sudden volume flow change.

With this provision of a main stage module as an additional function module, the pressure regulation valve accordingly comprises at least three function modules. However, the pressure regulation valve preferably comprises (merely) exactly these three function modules (actuator module, pilot stage module and main stage module) and is constructed from these three function modules. In the simplest case, the pressure regulation valve consists exactly of the actuator module, the pilot stage module and the main stage module. The pressure regulation valve is completely modular in the latter case and can be mounted, for example, by providing (only) exactly firm mechanical connections, preferably two press connections. Advantageously, all function modules of the pressure regulation valve are firmly interconnected (exclusively) via press connections.

Moreover, further mechanical, hydraulic and/or also magnetic interactions can be provided between the function modules. For example, a spring member of the main stage can be supported immediately on the actuator module or the pilot stage module. Likewise, the above-described operation of the pilot stage valve in the pilot stage module takes place by the actuator module or the operation member thereof. Furthermore, for example, the main stage module forms the pilot space together with the pilot stage module and possibly also the actuator module.

In a preferred embodiment, the actuator module itself is also constructed modularly or subdivided into sub-modules and, for this purpose, comprises a coil module, a magnetic drive module and a coil lid module or consists (exclusively) of these three modules. In order to form the actuator module, preferably the magnetic drive module is firmly connected to the coil lid module and subsequently the coil module is firmly connected to the coil lid module, thereby particularly preferably closing the magnetic circuit, wherein particularly preferably the magnetic drive module is arranged completely in an interior space created by the coil module and the coil lid module. Preferably, the coil module and the coil lid module together create a housing of the actuator module, which particularly preferably has a through opening for the operation member (merely) on the actuator axis and/or is otherwise completely closed and preferably has for that purpose a completely closed outer skin. The coil module comprises at least a magnetic coil and electrical connectors for energizing the magnetic coil, and preferably magnetically conductive material for (partially) forming the magnetic circuit on a face side (facing away from or located on the back side of the pilot stage module or main stage module) and particularly preferably also on the radial outer side of the coil module or the coil. The magnetic drive module comprises an operation member (in the simplest case consisting of merely a magnetic armature or comprising possibly further a non-magnetic piston firmly connected thereto) which is borne in linearly movable manner (along the actuator axis of the actuator module or the central axis of the pressure regulation valve), as well as one or several magnetically conductive construction members which are stationary in the actuator module or coil module (when arranged appropriately), at least a stationary pole core which, upon energization of the coil, magnetically attracts the magnetic armature or toward which the magnetic armature moves upon sufficient energization. The pole core is usually arranged on the actuator axis and, depending on the configuration of the magnetic drive module, possibly serves as an abutment for the magnetic armature. The magnetic drive module preferably further has a pole tube, a spring member and/or further stationary, magnetically conductive components for forming the magnetic circuit of the actuator module. Depending on the configuration of the magnetic drive module, the magnetic armature or the operation member, upon energization of the coil, is displaced to the back-side or the opposite, front-side face side of the coil module or of the magnetic coil. In other words, in the first case, the operation member enters the actuator module upon energization, so that there results an NC functionality for the pilot stage; in the latter case, the operation member exits the actuator module upon energization, so that there results an NO functionality for the pilot stage. The coil lid module likewise contains magnetically conductive material at least on the front-side face side (possibly also on the radial outer side) of the coil module or the coil and thus closes the magnetic circuit around the magnetic coil. The coil lid module can also be referred to as a housing plate. The coil lid module preferably further has a through hole for an operation member (for example the magnetic armature or a piston (firmly) connected thereto). Further, the through hole preferably has the press area of the actuator module or of the coil lid module for forming the press connection with the pilot stage module.

These three modules of the actuator module are preferably pre-mounted assembly groups, wherein the coil lid module is formed particularly preferably as a single piece and then accordingly consists completely of magnetically conductive material. Furthermore, the coil module and the magnetic drive module are preferably firmly connected to the coil lid module via (exactly) one press connection. These press connections are preferably created by corresponding, cylindrical press areas, which are particularly preferably arranged coaxially to the central axis. This does not only permit simple mounting of the actuator module. The above-explained advantageous subdivision of the construction members of an actuator module into these three modules or sub-modules additionally avoids components that relate to several modules, so that, for the forming of variants of the actuator module, one of its modules can be swapped for a variant thereof without requiring changes to the remaining modules. The above-described selection of components for the magnetic drive module in particular permits making available magnetic drive modules with opposing or different functionalities (NO or NC functionality) and leaving all interfaces (geometrical, magnetic, etc.) to the remaining modules of the actuator module unchanged while doing so. The connection between the magnetic drive module and the coil lid module is preferably additionally welded, in order to ensure stability and tightness toward the outside under pressure.

In a preferred embodiment of the pressure regulation valve the coil lid module is arranged centrally in the pressure regulation valve and/or preferably forms a or the only central construction piece of the pressure regulation valve, to which preferably all remaining function modules and modules or sub-modules are firmly connected. Accordingly, the coil lid module is preferably firmly connected to the pilot stage module, the main stage module, the coil module and the magnetic drive module via respectively one or exactly one press connection. The press connection between the coil lid module and the pilot stage module particularly preferably forms the only firm connection between the coil lid module and the pilot stage module. Particularly preferably the press connection between the coil lid module and the main stage module forms the only firm connection between the coil lid module and the main stage module. Particularly preferably the press connection between the coil lid module and the coil module forms the only firm connection between the coil lid module and the coil module. Particularly preferably, besides the press connection between the coil lid module and the magnetic drive module, there is additionally provided a welding connection, in particular a laser welding connection, between the coil lid module and the magnetic drive module. Accordingly, for creating the (exactly) four press connections to the pilot stage module, the main stage module, the coil module and the magnetic drive module, the coil lid module preferably has (exactly) four press areas, which are particularly preferably each formed cylindrically and/or arranged coaxially to the central axis. Furthermore, the pilot stage module, the main stage module, the coil module and the magnetic drive module respectively have no firm connection, in particular no press connection, screw connection and/or welding connection, among each other. This facilitates the modularity of the pressure regulation valve and, in the simplest case, limits changes in the pressure regulation valve, which occur as a consequence of changes to any one of the function modules or modules or sub-modules and which concern the respective attachment to the coil lid module, to a corresponding adaptation of the coil lid module.

The present invention further comprises a shock absorber with one, two or several of the above-described pressure regulation valves. In the simplest case the shock absorber comprises a pressure cylinder, in which an axially displaceable piston divides the volume of the pressure cylinder into two pressure chambers. In an advantageous embodiment, the shock absorber then comprises two of the above-described pressure regulation valves, wherein for each of the two possible flow directions between the pressure chambers there is provided a pressure regulation valve and possibly a check valve in each case. In an alternative embodiment, the shock absorber comprises exactly one pressure regulation valve which is combined with a fluid rectification.

BRIEF DESCRIPTION OF THE DRAWINGS

The invention will hereinafter be described by way of example with reference to the attached drawings. The drawings are merely schematic representations and the invention is not limited to the specific represented embodiment examples.

DETAILED DESCRIPTION

Figure 1A:
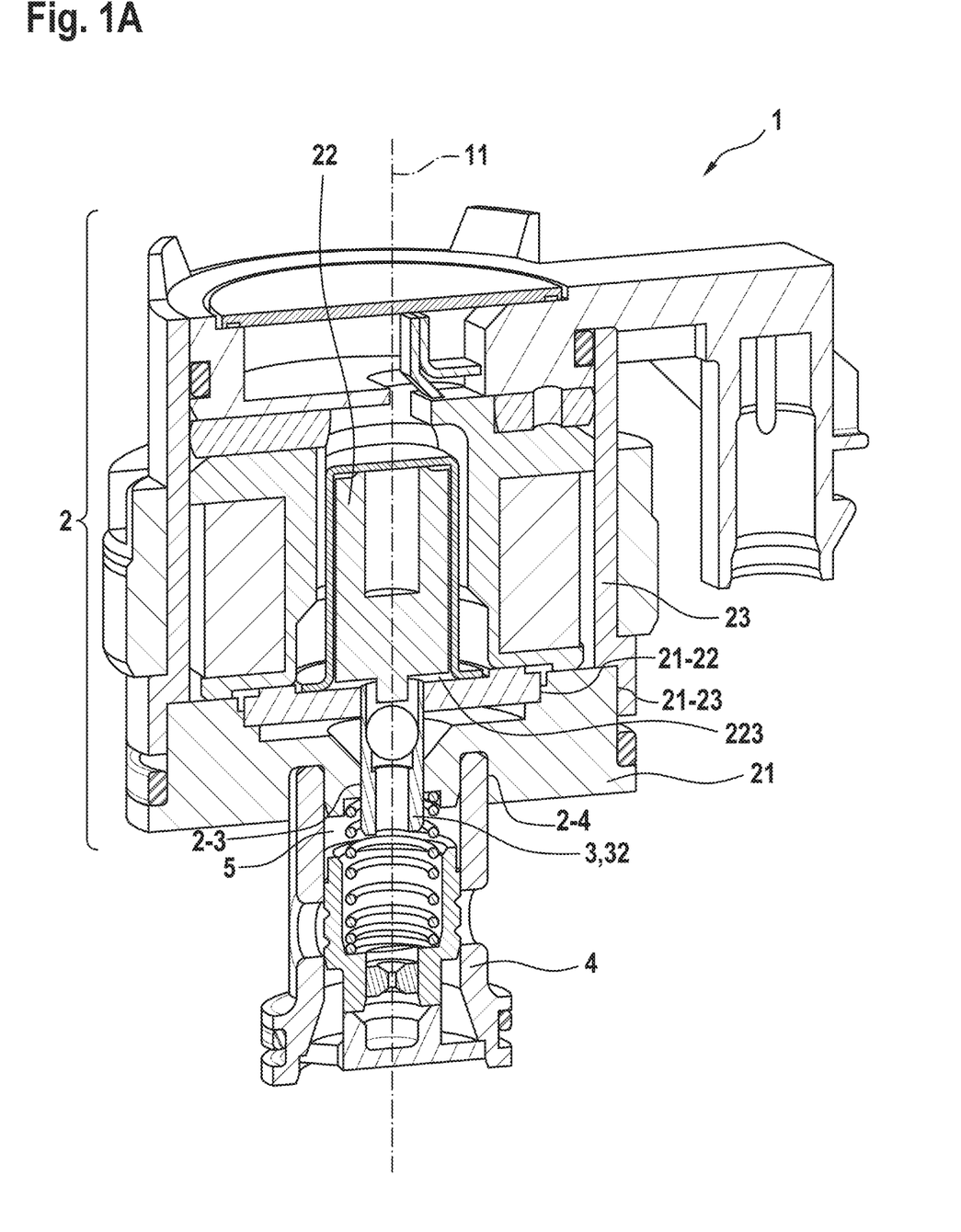
FIG. 1A shows a perspective sectional view of a pressure regulation valve with an NO magnetic drive module.
Figure 1B:
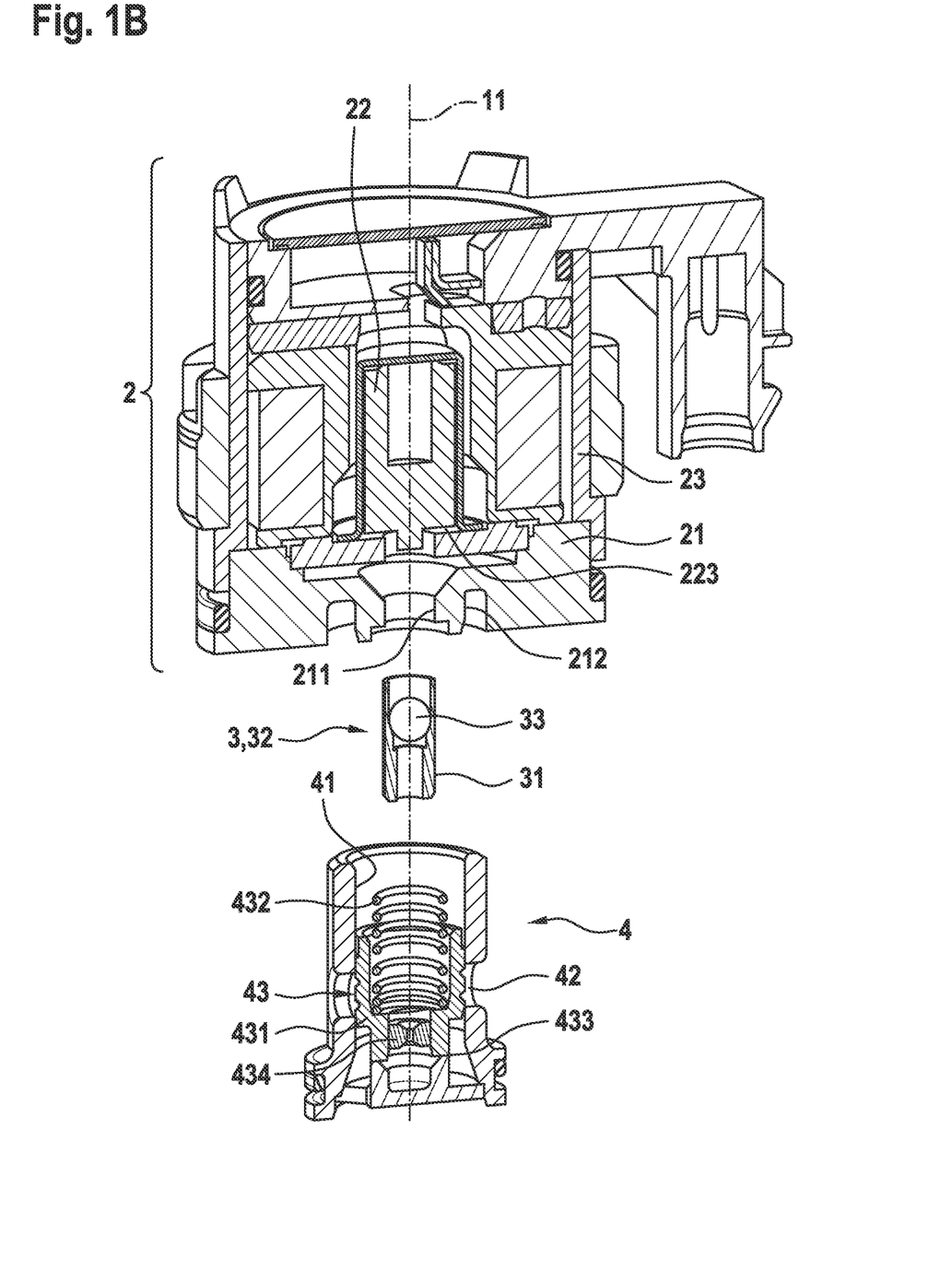
FIG. 1B shows a perspective sectional view of a pressure regulation valve with an NO magnetic drive module.

In FIG. 1A a pressure regulation valve 1 is represented in a perspective sectional view. The pressure regulation valve consists of exactly three function modules: an actuator module 2, a pilot stage module 3 and a main stage module 4. In FIG. 1B a perspective exploded view is represented with reference to these three function modules 2, 3, 4. The pilot stage module 3 has a radially outwardly located, cylindrical press area 31, which creates a press connection 21-22 between the actuator module 2 and the pilot stage module 3 with a corresponding press area 211 in the actuator module 2 or the coil lid module 21 thereof. Likewise, also the main stage module 4 has a cylindrical press area 41 which is located radially inside in the embodiment example represented, said press area creating a press connection 21-23 between the main stage module 4 and the actuator module 2 with a corresponding press area 212 in the actuator module 2 or the coil lid module 21.

The main stage module represented has an axial connector for the fluid or hydraulic fluid to be controlled, radial outflow openings 42 and further a main stage valve 43 with a valve body 431 which is axially movable on the central axis of the pressure regulation valve 1. In the embodiment example represented the main stage valve 43 is a piston slide valve. The valve body 431 is biased onto an abutment 433 by a spring member 432 and closes the main stage valve 43 in the pressureless state while doing so. The control edge of the valve body 431 is located on the outer diameter thereof and interacts with the radial outflow openings 42.

In an embodiment variant not explicitly represented, the main stage valve 43 is a seat valve. The abutment 433 represented in FIGS. 1A and 1B in the simplest case forms a valve seat 433, so that the control edge of the valve body 431 is located on the axial side thereof facing the valve seat 433 and said edge then interacts with the valve seat 433.

Further, the valve body 431 of the main stage valve 43 (in both above-mentioned embodiment variants) comprises a throttle 434 in the manner known per se and thereby creates the pilot space 5 in interaction with the pilot stage module 3 and presently the actuator module 2. Thereby the main stage valve 43 opens when there is a sufficiently low pressure in the pilot space 5 or when a force is produced by the pressure decrease at the throttle of the valve body 431 which overcomes the spring force of the spring member 432.

Figure 1C:
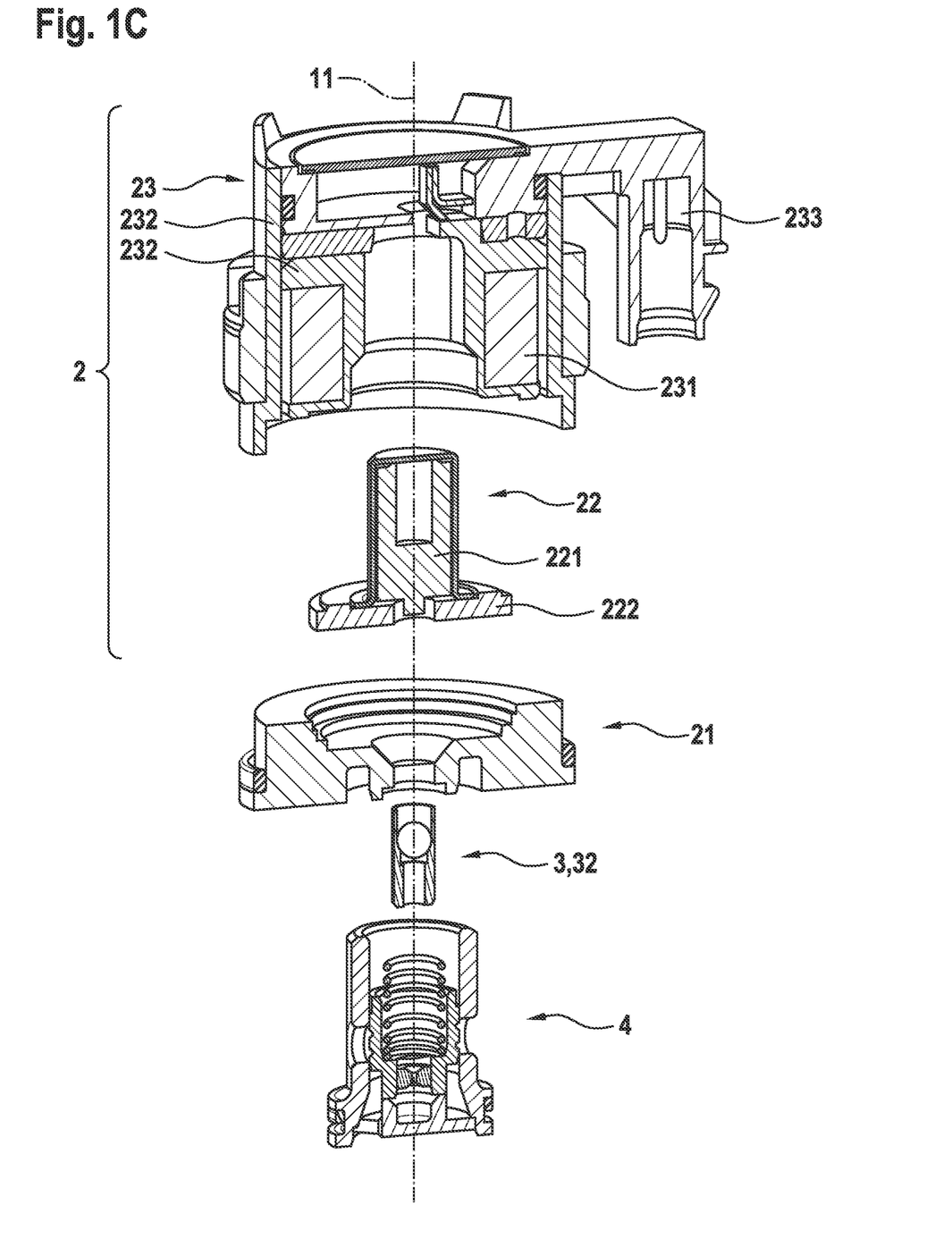
FIG. 1C shows a perspective sectional view of a pressure regulation valve with an NO magnetic drive module.

In FIG. 1C there is also represented the modularly constructed actuator module 2 in an exploded view with reference to its assembly groups or modules coil lid module 21, magnetic drive module 22 and coil module 23. The coil module 23 comprises a magnetic coil 231, magnetically conductive material 232 to create (a part of) the magnetic circuit and an electrical connector 233 for supplying the magnetic coil 231. The magnetic drive module 22 has an operation member in the form of a magnetic armature 221, which is linearly displaceable along an actuator axis, which also coincides with the central axis 11 of the pressure regulation valve 1 in the Figures, and presently directly operates a valve body 33 of the pilot stage valve 32 of the pilot stage module 3. The coil lid module 21 is presently constructed as a single piece of a magnetically conductive material, closes the magnetic circuit and, together with the coil module, creates a housing for the actuator module 2. In the represented embodiment example the coil lid module 21 and the coil module 23 are firmly interconnected exclusively via exactly one press connection. Further, the coil lid module 21 and the magnetic drive module 22 are firmly interconnected via a press connection and additionally via a welding connection. The modules of the actuator module 2 have corresponding press areas for this purpose. In contrast, the magnetic drive module 22 and the coil module 23 are not firmly interconnected.

The magnetic drive module 22 shown in FIGS. 1A, B and C has a pole core 223, which is arranged at an end of the magnetic drive module directed toward the pilot stage module 3. When the magnetic coil 231 is energized, the magnetic armature 221 is displaced in the direction of the pole core 223 and thus in the direction of the pilot stage module 3. Accordingly, the pilot stage valve 32 is closed upon energization, so that the magnetic drive module 22 represented in FIGS. 1A to 1C creates an NO valve.

Figure 2:
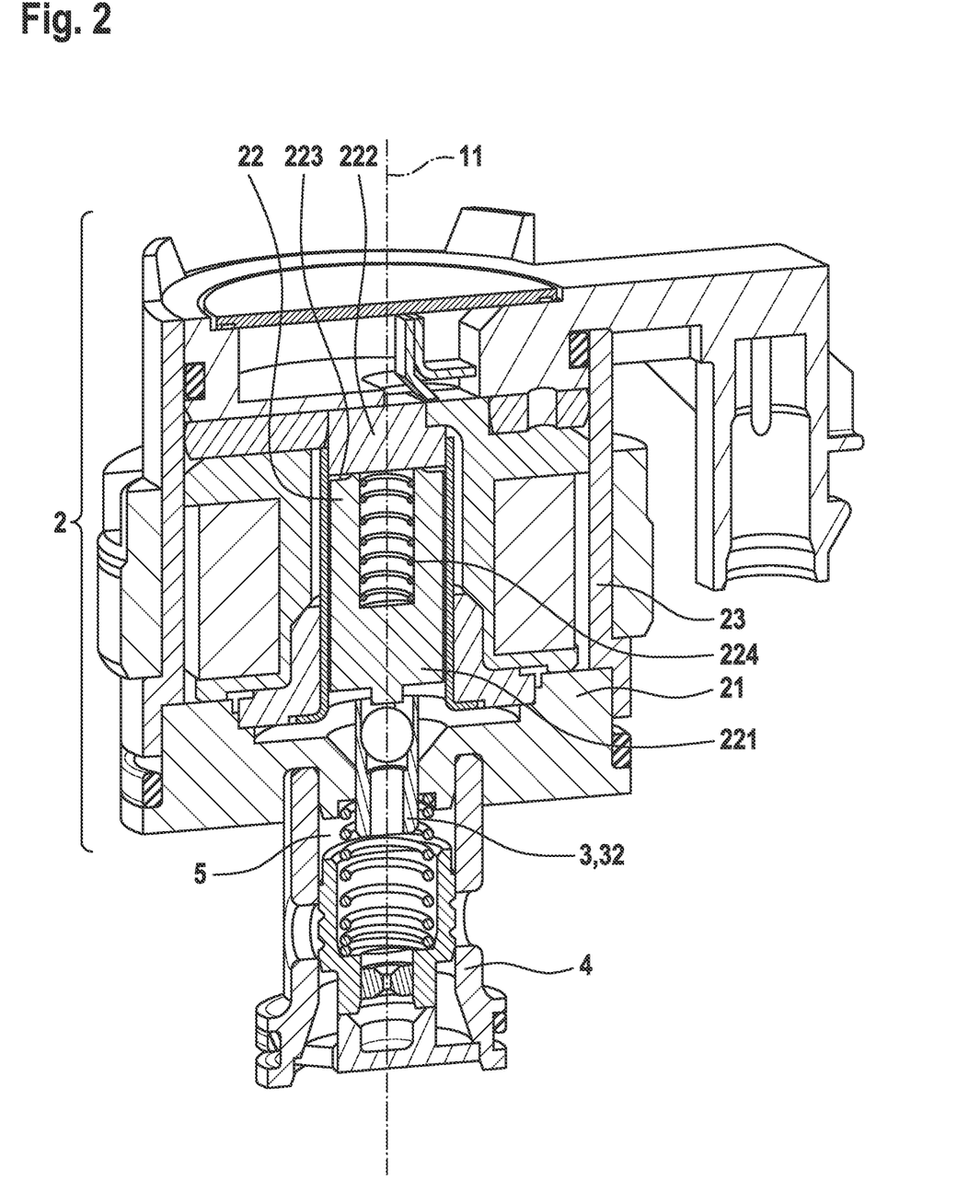
FIG. 2 shows a perspective sectional view of a pressure regulation valve with an NC magnetic drive module.

In FIG. 2 a variant of the pressure regulation valve 1 of FIGS. 1A to 1C is represented, which differs only with respect to the construction of the magnetic drive module 22. Here, the pole core 223 is arranged at the end of the magnetic drive module 22 facing away from the pilot stage module, so that, upon energization, the magnetic armature 221 moves away from the pilot stage module 3. Further, a spring member 224 is provided here, which, in the unenergized case, biases the magnetic armature 221 away from the pole core 223 and in the direction of the pole stage module 3, so that the pilot stage module 32 is closed in the unenergized case. The magnetic drive module 22 represented in FIG. 2 thus creates an NC valve.

Figure 3A:
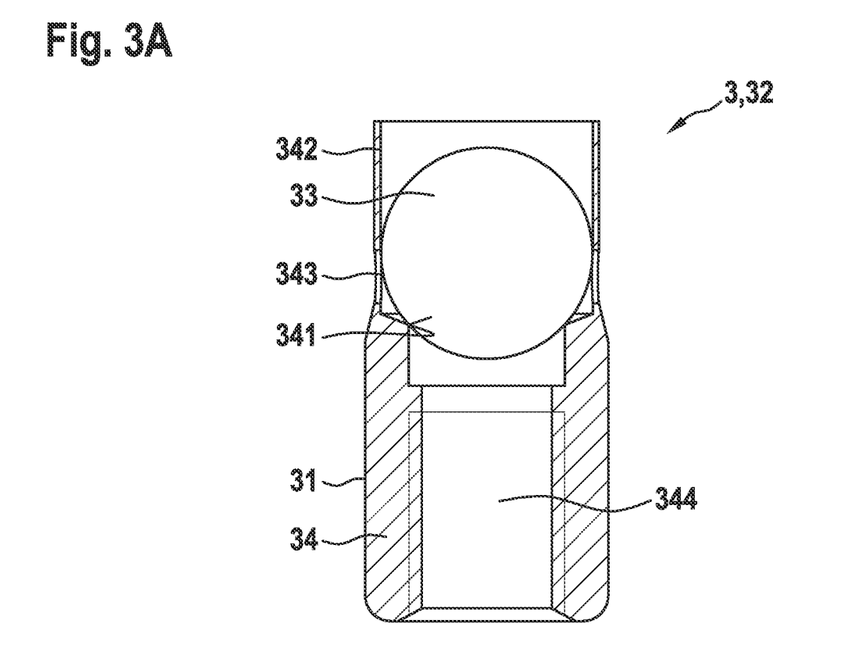
FIG. 3A shows a sectional view through a pilot stage module.

In FIG. 3A a section through a pilot stage module 3 is represented. This comprises a module body 34 and a valve body 33, which is presently formed as a ball valve body. The module body 34 comprises on the inner side a valve seat 341, which is presently formed as a conical seat, and, downstream thereof, i.e. located on the top in FIG. 3A, a guide section 342 with a cylindrical, inner-side guide for the ball valve body 33, when said ball valve body is lifted off the valve seat 341. Further, the module body 34 comprises radial outflow openings 343 for the fluid when the pilot stage valve 32 is opened, which are arranged axially between the valve seat 341 and the guide section 342 in the represented embodiment example. On its radial outer side, the module body further comprises the press area 31 already described above.

Figure 3B:
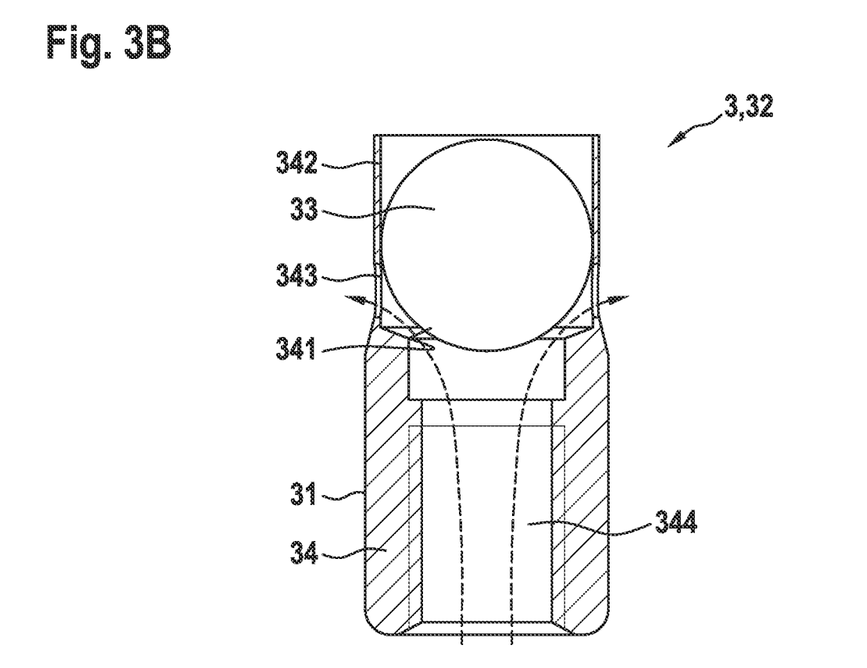
FIG. 3B shows a sectional view through a pilot stage module.

In FIG. 3A the pilot stage module 3 or its pilot stage valve 32 is represented in a closed state; the ball valve body 33 closes the conical valve seat 341. In FIG. 3B the pilot stage valve is represented in an open state; the ball valve body 33 is lifted off the conical valve seat 341 and the fluid flows out of the pilot space 5 through the interior of the module body 34, past the valve seat 341 and the valve body 33, and leaves the pilot stage module 3 via the radial outflow openings 343.

Figure 3C:
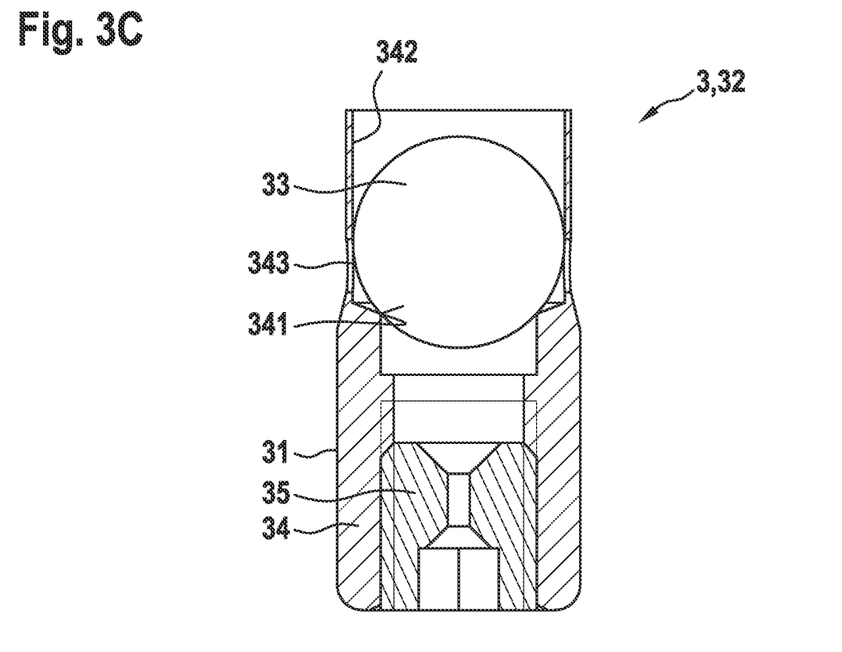
FIG. 3C shows a sectional view through a pilot stage module.

Further, the module body 34 comprises a recess 344 for receiving a fluid component 35 upstream of the valve seat 341. Presently, said component is formed as the throttle 35, as represented in FIG. 3C. Such a throttle 35 permits, for example, to adjust or vary the slope in a p-Q diagram, i.e. the increase of the fluid flow with reference to the increase of a pressure present. In addition, the damping of the main stage and thereby the dynamic behavior of the valve can be influenced with the aid of the cover or throttle 35.

Figure 4A:
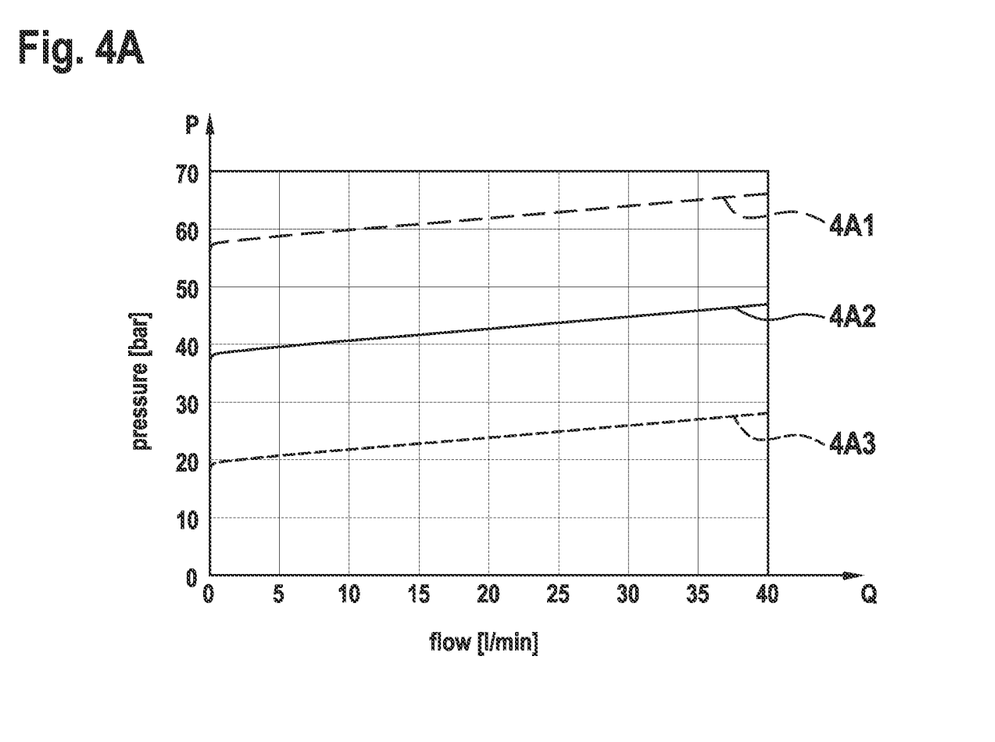
FIG. 4A shows p-Q characteristic lines.
Figure 4B:
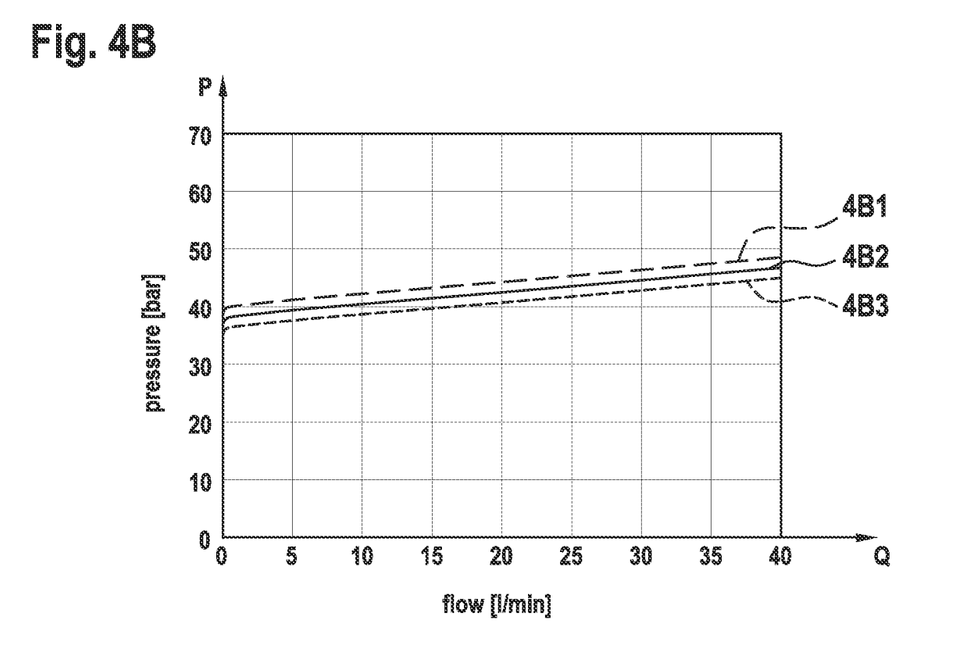
FIG. 4B shows p-Q characteristic lines.

In FIGS. 4A and 4B various p-Q diagrams of the pressure regulation valve 1 are represented. Generally, initially no fluid flows through the pressure regulation valve 1 while the pressure increases from zero, since the main stage valve 42 and the pilot stage valve 32 are closed. Upon reaching the so-called opening pressure the pilot stage valve 32 opens, so that a pressure decrease takes place in the pilot space 5, which then also opens the main stage valve 42. After reaching the opening pressure, the fluid flow through the pressure regulation valve 1 increases with a small slope and presently approximately linearly while the pressure increases further.

In FIG. 4A various characteristic lines are represented for various seat diameters of the conical valve seat 341. Generally, at a given pressure present at the pressure regulation valve 1 a smaller hydraulic force is exerted on the valve body 33 in the case of a small seat diameter than in the case of a larger seat diameter. Accordingly, in the case of a small seat diameter the pilot stage valve opens only at a relatively high opening pressure. In FIG. 4A the characteristic line 4A1, which has the highest opening pressure, corresponds to the smallest seat diameter of the conical valve seat 341, the characteristic line 4A2 with a medium opening pressure to a medium seat diameter and the characteristic line 4A3 with a low opening pressure to the largest seat diameter. The remaining parameters, for example the energization of the pressure valve 1, were kept constant and presently set to the maximal current.

In FIG. 4B again p-Q characteristic lines are represented, here for the case of different sizes of the air gap 223 between the magnetic armature 221 and the pole core 222. Said gap is presently implemented by an axial sliding of the pilot stage module 3 in the actuator module 2 or its coil lid module 21, wherein the pilot stage module 3 and the actuator module 2 are connected via a press connection. It is assumed presently that the valve is an NO valve. The upper characteristic line 4B1 on the top in the diagram with the highest opening pressure is implemented with a small air gap, i.e. when the pilot stage module 1 is inserted less deeply into the actuator module 2 and correspondingly the magnetic armature 221 abuts on the valve body 222 of the pilot stage valve 32 only when there is a relatively small air gap 223 to the pole core 222. In contrast, the characteristic line 4B3 on the bottom of the diagram corresponds to the case that the magnetic armature 221 already abuts on the valve body 33 of the pilot stage valve 32 when there is a relatively large air gap 223, which can be achieved by inserting the pilot stage module 3 more deeply into the actuator module 2. The middle characteristic 4B2 then corresponds to a medium-sized air gap 223.

Figure 5A:
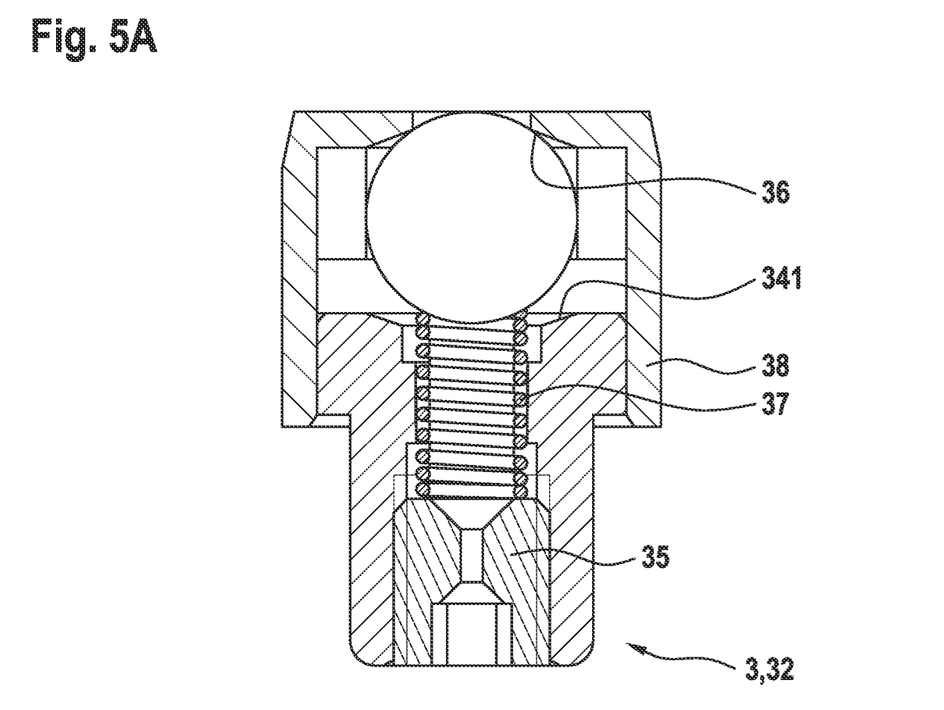
FIG. 5A shows a sectional view through a second embodiment example of a pilot stage module.

In FIG. 5A a section through a second embodiment example of a pilot stage module 3 is represented, which has a throttle 35. In addition to the configuration represented in FIG. 3C, for example, the second embodiment example represented in FIG. 5 comprises a failsafe valve seat 36 as a second valve seat, which is located opposite the conical valve 341 as the first valve seat and is likewise formed as a conical seat itself. Further, the second embodiment example of the pilot stage module 3 comprises a spring member 37, which biases the ball valve body 33 into the failsafe valve seat 36 and also holds it in the failsafe valve seat 36 in the unenergized case. The failsafe valve seat 36 in the represented embodiment example is made available via an additional component, the so-called failsafe construction member 38.

Figure 5B:
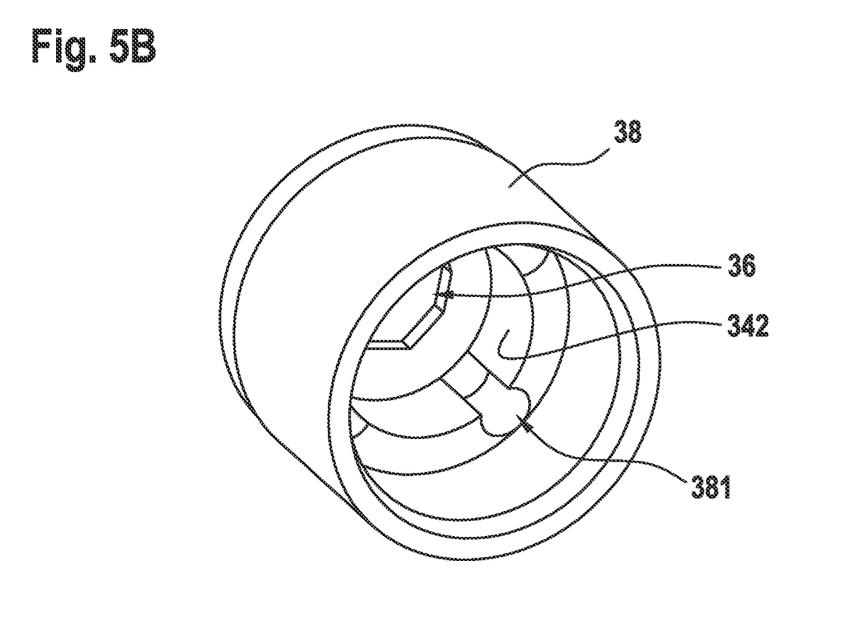
FIG. 5B shows a perspective view of a failsafe construction member.

In FIG. 5B a perspective internal view of the failsafe construction member 38 is represented. In this second embodiment example the guide section 342 for the ball valve body 33 is not created by the module body 34, but by the failsafe construction member 38, wherein the failsafe construction member 38 is arranged as a cap axially on the downstream side of the conical valve seat 341 on the module body 34. Likewise, there exist no radial outflow openings in the pilot stage module 3 or the module body 34; rather, the axial opening of the failsafe valve seat 36 is the only fluid through-flow opening in the pilot stage module 3 according to the second embodiment example.

When the ball valve body 33 is located in the failsafe valve seat 36, said seat is not closed completely. Presently, this is ensured by lateral bypass openings 381 in the guide section 342 of the failsafe valve seat 36 and/or by a non-circular contour of the failsafe valve seat 36 or its fluid through-flow opening. In the represented embodiment example, the failsafe valve seat is a polygon in the form of a regular octagon. However, also other, preferably regular, polygons can be employed.

In the unenergized case, when the magnetic armature 221 exerts no force on the pilot stage valve 32 (NO valve or actuator module whose magnetic armature extends upon energization), the ball valve body 33 is held in the downstream failsafe valve seat 36 by the spring member. Said seat does not close the fluid path through the pilot stage valve 32 completely, but, by the bypass openings 381 or the, for example, polygonal shape of the failsafe valve seat 36, in the unenergized case, ensures a specific (medium, different from zero, non-maximal) free fluid cross section. In this operating state, the pilot valve then acts like an additional, constant throttle in the pilot stage valve 32. Since the failsafe valve seat 36 with its throttle effect is located downstream of the pilot space 5, in which the pressure for controlling the main valve is formed, the fluid is additionally backed up in the pilot space 5. Consequently, a higher pressure must be present at the main stage valve in order to produce the pressure decrease at the valve body 431 of the main stage valve 43 or its throttle which is required for opening the main stage valve 43. The opening pressure of a failsafe characteristic line 6A2 in the p-Q diagram (see FIG. 6) is therefore higher than that of the characteristic line for the so-called minimum energization 6A3, in which the pilot stage valve 32 is maximally opened or has the largest fluid passage cross section.

Figure 6:
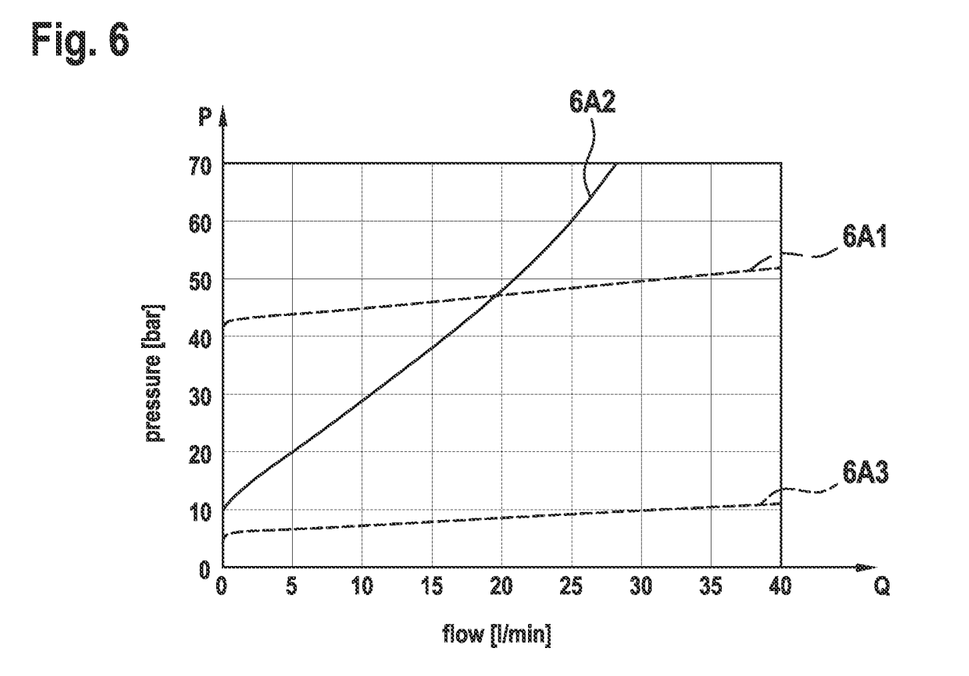
FIG. 6 shows a p-Q characteristic line of a pilot stage according to the second embodiment example.

At the so-called minimum energization of the coil, the ball valve body 32 is lifted off the failsafe valve seat 36 by the magnetic armature 221, generally the operation member of the actuator module 2, against the spring force of the spring member 27, and is moved to a middle position between the failsafe valve seat 36 and the conical valve seat 341. Upon minimum energization, thus a p-Q characteristic line is implemented which (analogously to an NO valve) has an only low opening pressure and extends approximately linearly with a small slope above the opening pressure. The opening pressure is not equal to zero in this case either, since initially a minimum pressure must be built up at the main stage in order to produce a sufficient pressure decrease via the throttle of the valve body 43 of the main stage valve 42 in order to overcome the spring force of the spring member 432 of the main stage valve 43.

Upon maximum energization, the ball valve body 33 is pressed onto the conical valve seat 341 of the pilot stage valve 32 in a pressureless fall, so that the pilot stage valve 32 opens only after overcoming the magnetic force, i.e. only at a relatively high opening pressure (characteristic line 6A1 in FIG. 6). When the pressure increases further, the fluid stream then increases in the same manner as upon minimum energization.

In contrast, in the unenergized case, when the valve body 32 is located in the failsafe valve seat 36, a greater increase of the pressure at the main stage is required to produce the required pressure difference. Consequently, the volume flow increases significantly more slowly upon increasing pressure at the main stage in the unenergized case (failsafe case) than upon minimum or maximum energization.

Figure 7:
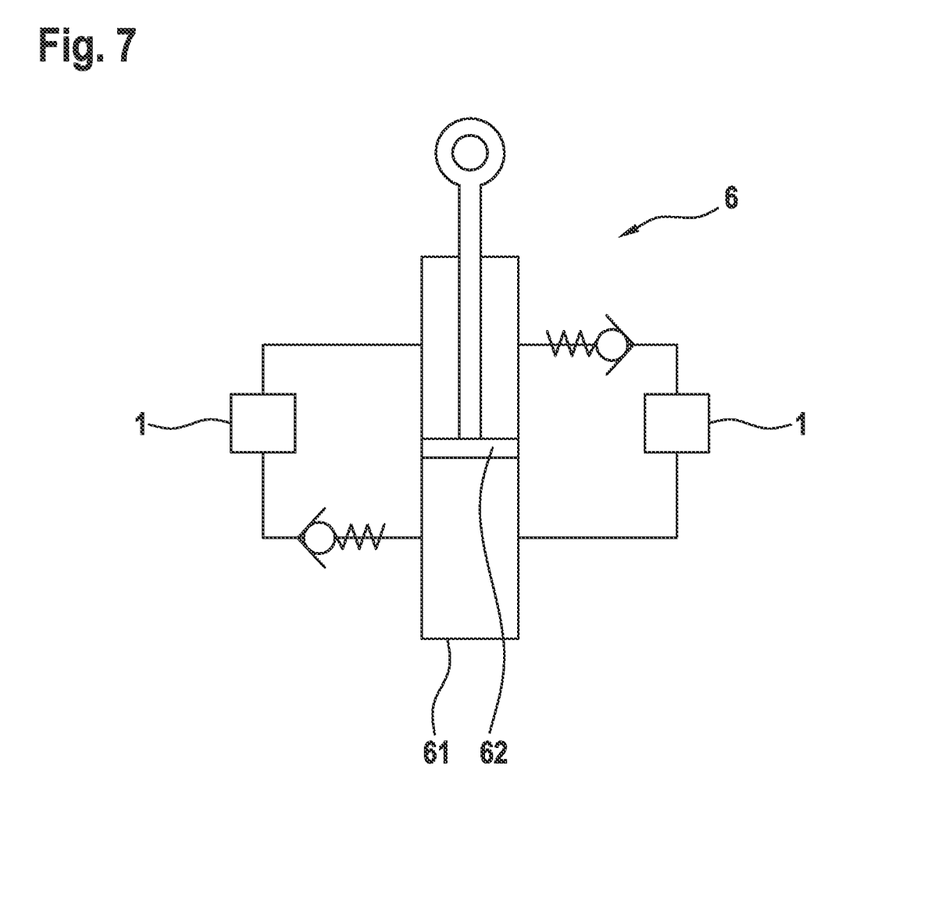
FIG. 7 shows a schematic representation of a shock absorber with two pressure regulation valves.

In FIG. 7 a shock absorber 6 with two pressure regulation valves 1 is represented schematically. The shock absorber 6 comprises a pressure cylinder 61, in which an axially displaceable piston 62 divides the volume of the pressure cylinder into two pressure chambers, which are connected via respectively one pressure regulation valve 1 (and a check valve) for each flow direction. Instead of the two pressure regulation valves 1 represented in FIG. 7 it is also possible to employ one single pressure regulation valve 1 with fluid rectification (not represented).

LIST OF REFERENCE NUMERALS 1 pressure regulation valve
11 central axis
2 actuator module
21 coil lid module 211 press area
212 press area
22 magnetic drive module
221 magnetic armature, operation member
222 pole core
223 air gap
224 spring member
23 coil module
231 magnetic coil
232 magnetically conductive material
233 electrical connector
3 pilot stage module
31 press area
32 pilot stage valve
33 valve body, ball valve body
34 module body
341 valve seat, conical valve seat
342 guide section
343 radial outflow openings
344 recess for 35
35 throttle, cover, fluid component
36 failsafe valve seat
37 spring member, helical spring
38 failsafe construction member
381 bypass openings
4 main stage module
41 press area
42 radial outflow openings
43 main stage valve
431 valve body
432 spring member, helical spring
433 abutment/valve seat
434 throttle
5 pilot space
6 shock absorber
61 pressure cylinder
62 piston

The invention claimed is:

1. A pressure regulation valve comprising:
a pilot stage valve with a ball valve body and a conical seat,
the pilot stage valve has a failsafe valve seat at the end of a guide section located opposite the conical seat, and a spring member, which biases the ball valve body into the failsafe valve seat, and
a multiplicity of function modules comprising an actuator module and a pilot stage module, which comprises the pilot stage valve, wherein the pilot stage module and the actuator module are firmly interconnected via a press connection, and have a central axis.

2. The pressure regulation valve according to claim 1, wherein the pilot stage valve has a single-piece module body which has the conical seat and the guide section.

3. The pressure regulation valve according to claim 1, wherein the pilot stage valve has a receiving section for receiving a fluid component, including a throttle, which has a thread.

4. The pressure regulation valve according to claim 1, further comprising a main stage module as a further function module, which is firmly connected to the actuator module or the pilot stage module via a press connection and which has a main stage valve which is formed as a piston slide valve or as a seat valve.

5. The pressure regulation valve according to any of claim 1, wherein the pressure regulation valve consists of or is constructed exclusively from function modules and/or at least or exactly of/from the actuator module, the pilot stage module and the main stage module.

6. The pressure regulation valve according to claim 1, wherein the actuator module has an actuator with an actuator axis, wherein the actuator is formed as a linear actuator and/or the actuator module has a cylindrical press area, which is arranged coaxially to the actuator axis.

7. The pressure regulation valve according to claim 1, wherein the pilot stage module
has a pilot stage valve which is operated along a valve axis and/or
has a cylindrical press area which is arranged coaxially to the valve axis.

8. The pressure regulation valve according to claim 6, wherein the actuator axis and the valve axis of the pilot stage valve form a common central axis of the pressure regulation valve.

9. The pressure regulation valve according to claim 1, wherein an operation member of the actuator module abuts on a valve body of the pilot stage module for operating the pilot stage valve.

10. The pressure regulation valve according to claim 4, wherein the press connection between the main stage module and the actuator module or the pilot stage module is created by corresponding cylindrical press areas, which are arranged coaxially to the central axis.

11. The pressure regulation valve according to claim 1, wherein the actuator module comprises a coil module, a magnetic drive module and a coil lid module, wherein the coil module and the magnetic drive module are firmly connected to the coil lid module via a press connection in each case, wherein each of the press connections is created by respectively two corresponding cylindrical press areas, which are arranged coaxially to the central axis, and/or wherein no firm connection, is provided between the coil module and the magnetic drive module.

12. The pressure regulation valve according to claim 11, wherein the coil lid module is arranged centrally in the pressure regulation valve and/or the coil lid module is firmly connected to the pilot stage module, the main stage module, the coil module and the magnetic drive module via respectively one press connection and the pilot stage module, the main stage module, the coil module and the magnetic drive module do not have a firm connection among each other.

13. The pressure regulation valve according to claim 11, wherein the magnetic drive module has a movably borne operation member or a movably borne magnetic armature and preferably a pole core.

14. A shock absorber comprising one, two or several pressure regulation valves according to claim 1.

* * * * *